United States Patent
Spyrou et al.

(10) Patent No.: US 9,550,313 B2
(45) Date of Patent: Jan. 24, 2017

(54) PROCESS FOR THE PRODUCTION OF STORAGE-STABLE EPOXY PREPREGS, AND COMPOSITES PRODUCED THEREFROM, BASED ON EPOXIDES AND ACIDS AMENABLE TO FREE-RADICAL POLYMERISATION

(71) Applicants: Emmanouil Spyrou, Schermbeck (DE); Holger Loesch, Herne (DE); Susanne Kreischer, Herten (DE); Andrea Thesing, Ahaus (DE)

(72) Inventors: Emmanouil Spyrou, Schermbeck (DE); Holger Loesch, Herne (DE); Susanne Kreischer, Herten (DE); Andrea Thesing, Ahaus (DE)

(73) Assignee: EVONIK DEGUSSA GmbH, Essen (DE)

( * ) Notice: Subject to any disclaimer, the term of this patent is extended or adjusted under 35 U.S.C. 154(b) by 38 days.

(21) Appl. No.: 14/685,162

(22) Filed: Apr. 13, 2015

(65) Prior Publication Data
US 2015/0306790 A1     Oct. 29, 2015

(30) Foreign Application Priority Data
Apr. 25, 2014 (DE) .................. 10 2014 207 785

(51) Int. Cl.
| | | |
|---|---|---|
| B29C 70/06 | (2006.01) |
| B29B 15/10 | (2006.01) |
| C08K 7/14 | (2006.01) |
| C08J 5/24 | (2006.01) |
| B29K 63/00 | (2006.01) |
| B29K 105/08 | (2006.01) |
| B29K 307/04 | (2006.01) |
| B29K 309/02 | (2006.01) |
| B29K 309/08 | (2006.01) |

(52) U.S. Cl.
CPC .......... B29B 15/105 (2013.01); B29C 70/06 (2013.01); C08J 5/24 (2013.01); C08K 7/14 (2013.01); *B29K 2063/00* (2013.01); *B29K 2105/0809* (2013.01); *B29K 2105/0854* (2013.01); *B29K 2307/04* (2013.01); *B29K 2309/02* (2013.01); *B29K 2309/08* (2013.01); *B29K 2995/0096* (2013.01); *C08J 2333/04* (2013.01)

(58) Field of Classification Search
None
See application file for complete search history.

(56) References Cited

U.S. PATENT DOCUMENTS

| | | | | |
|---|---|---|---|---|
| 3,450,613 A * | 6/1969 | Steinberg | ............ | C08F 299/026 522/103 |
| 3,935,330 A * | 1/1976 | Smith | .................. | B05D 3/0209 427/487 |
| 3,989,610 A * | 11/1976 | Tsukada | .................... | C08F 2/46 430/280.1 |
| 4,092,443 A * | 5/1978 | Green | .................... | C08F 283/10 427/513 |
| 4,252,593 A * | 2/1981 | Green | .................... | C08F 283/10 156/182 |
| 4,337,657 A | 7/1982 | Morris | | |
| 4,460,746 A | 7/1984 | Fock et al. | | |
| 4,666,954 A * | 5/1987 | Forgo | .................... | C08G 59/50 156/273.3 |
| 4,776,992 A * | 10/1988 | Irving | ................. | B29C 37/0032 264/137 |
| 4,954,304 A * | 9/1990 | Ohtake | ................... | B32B 15/14 264/137 |
| 4,954,616 A | 9/1990 | Callens et al. | | |
| 5,539,012 A * | 7/1996 | Klemarczyk | ......... | C08F 283/10 428/34.5 |
| 5,612,424 A * | 3/1997 | Sato | .................... | C08F 290/062 428/320.2 |
| 5,679,719 A * | 10/1997 | Klemarczyk | ......... | C08F 283/10 427/501 |
| 5,700,417 A * | 12/1997 | Fernyhough | ............ | B29C 35/10 264/477 |
| 6,063,839 A * | 5/2000 | Oosedo | ........................ | C08J 5/24 428/297.4 |
| 6,207,726 B1 * | 3/2001 | Ohtani | ..................... | C08J 3/243 522/100 |
| 6,214,460 B1 * | 4/2001 | Bluem | ....................... | C09J 4/00 428/355 AC |
| 8,455,090 B2 | 6/2013 | Schmidt et al. | | |
| 2007/0196412 A1* | 8/2007 | Karl | ....................... | A01N 25/10 424/411 |
| 2008/0199606 A1* | 8/2008 | Karl | ........................ | A01N 37/52 427/158 |

(Continued)

FOREIGN PATENT DOCUMENTS

| | | |
|---|---|---|
| EP | 0 016 247 A1 | 10/1980 |
| EP | 0 056 427 A2 | 7/1982 |
| EP | 0 309 221 A2 | 3/1989 |
| EP | 0 590 702 A1 | 4/1994 |

(Continued)

OTHER PUBLICATIONS

U.S. Appl. No. 14/774,395, filed Sep. 10, 2015, Spyrou, et al.
"Resins for Coatings", Chemistry, Properties and Applications, eds Dieter Stoye and Werner Freitag, Hanser Publishers, Munich Vienna New York, Hanser/Gardner Publications, Inc., Cincinnati, pp. 203-205 (1996) with English translation.

*Primary Examiner* — Robert S Loewe
(74) *Attorney, Agent, or Firm* — Oblon, McClelland, Maier & Neustadt, L.L.P.

(57) ABSTRACT

A process for the production of storage-stable epoxy prepregs is provided. In addition, composites produced from the prepregs based on epoxides and acids having groups reactive to free-radical polymerization is provided.

19 Claims, No Drawings

(56) References Cited

U.S. PATENT DOCUMENTS

| | | | |
|---|---|---|---|
| 2009/0004483 A1* | 1/2009 | Fallais | C08F 283/01 428/430 |
| 2009/0131622 A1* | 5/2009 | Ichinose | C08F 283/06 528/103.5 |
| 2012/0003890 A1 | 1/2012 | Schmidt et al. | |
| 2012/0003891 A1 | 1/2012 | Schmidt et al. | |
| 2012/0261060 A1* | 10/2012 | Jones | C08J 5/24 156/196 |
| 2013/0045652 A1 | 2/2013 | Schmidt et al. | |
| 2013/0202873 A1* | 8/2013 | Mizuki | C08G 59/38 428/299.1 |
| 2013/0230716 A1 | 9/2013 | Schmidt et al. | |
| 2013/0231017 A1 | 9/2013 | Schmidt et al. | |
| 2013/0231022 A1 | 9/2013 | Schmidt et al. | |
| 2013/0303042 A1 | 11/2013 | Schmidt et al. | |
| 2013/0316169 A1* | 11/2013 | Matsuda | C08J 5/24 428/339 |
| 2013/0323993 A1 | 12/2013 | Schmidt et al. | |
| 2014/0065911 A1 | 3/2014 | Schmidt et al. | |
| 2014/0087613 A1 | 3/2014 | Spyrou et al. | |
| 2014/0309337 A1* | 10/2014 | Nagano | C08J 5/24 523/428 |

FOREIGN PATENT DOCUMENTS

| | | |
|---|---|---|
| WO | WO 89/04335 | 5/1989 |
| WO | WO 98/50211 | 11/1998 |
| WO | WO 99/64216 | 12/1999 |
| WO | WO 2005/091715 A2 | 10/2005 |
| WO | WO 2006/043019 A1 | 4/2006 |
| WO | WO 2010/108701 A1 | 9/2010 |
| WO | WO 2010/108723 A1 | 9/2010 |
| WO | WO 2011/147688 A1 | 12/2011 |
| WO | WO 2012/038200 A1 | 3/2012 |
| WO | WO 2012/038201 A1 | 3/2012 |
| WO | WO 2012/038203 A1 | 3/2012 |
| WO | WO 2012/093006 A1 | 7/2012 |
| WO | WO 2012/130672 A1 | 10/2012 |
| WO | WO 2014/139796 A1 | 9/2014 |

\* cited by examiner

PROCESS FOR THE PRODUCTION OF STORAGE-STABLE EPOXY PREPREGS, AND COMPOSITES PRODUCED THEREFROM, BASED ON EPOXIDES AND ACIDS AMENABLE TO FREE-RADICAL POLYMERISATION

CROSS REFERENCE TO RELATED APPLICATIONS

This application claims priority to German Application No. 102014207785.0 filed Apr. 25, 2014, the disclosure of which is incorporated herein by reference in its entirety.

BACKGROUND OF THE INVENTION

The invention relates to a process for the production of storage-stable epoxy prepregs and to composite components (mouldings) produced therefrom. The prepregs and components are produced by mixing acids and epoxides, where at least one of the two components comprises groups amenable to free-radical polymerisation. It is optionally possible to add, to the mixture, other epoxides and/or acids not amenable to free-radical polymerisation, and also free-radical initiators, e.g. photoinitiators. This mixture or solution is applied by known processes onto fibre material, e.g. carbon fibres, glass fibres or polymer fibres, and polymerised by radiation or plasma methods.

The polymerisation reaction, e.g. at room temperature or at up to 80° C., gives thermoplastics or thermoplastic prepregs which can then subsequently be subjected to a forming process. Elevated temperature can then be used to crosslink the acid-functionalised constituents with the epoxides already present in the system. It is thus possible to produce dimensionally stable thermosets and, respectively, crosslinked composite components.

Fibre-reinforced materials in the form of prepregs are used in many industrial applications because of their ease of handling and increased efficiency during processing, compared with the alternative wet-layup technology.

Industrial users of systems of this type demand not only lower cycle times and better storage stability values—at temperatures including room temperature—but also the possibility of cutting the prepregs to size without the problem of contamination of the cutting tools by the, often sticky, matrix material during automated cutting-to-size and layup of the individual prepreg layers.

Various moulding processes, e.g. the reaction transfer moulding (RTM) process, comprise the introduction of the reinforcing fibres into a mould, closing of the mould, introduction of the crosslinkable resin formulation into the mould, and subsequent crosslinking of the resin, typically by introduction of heat.

One of the limitations of a process of this type is that insertion of the reinforcing fibres into the mould is quite difficult. The individual layers of the woven fabric or laid scrim must be cut to size and adapted to the various geometries of moulds. This can be both time-consuming and complicated, particularly if the mouldings are also intended to comprise foam cores or other cores. Premouldable fibre reinforcement systems permitting easy handling and use of existing methods for forming processes would be advantageous.

Within the field of crosslinking matrix systems in addition to polyesters, vinyl esters and epoxy systems, there are a number of specialised resins. These include polyurethane resins; because these are tough, damage-tolerant and strong they are in particular used for the production of composite profiles by pultrusion processes. A disadvantage noted with such systems is that the isocyanates used may be toxic.

Prepregs and composites produced therefrom, based on epoxy systems, are described in WO 98/50211, EP 309 221, EP 297 674, WO 89/04335 and U.S. Pat. No. 4,377,657. WO 2006/043019 describes a method for the production of prepregs on the basis of epoxy-resin polyurethane powders. Prepregs based on pulverulent thermoplastics as matrix have also been disclosed. WO 99/64216 describes prepregs and composites, and also a method for production thereof by using emulsions with polymer particles sufficiently small to permit single-fibre coating. The viscosity of the polymers of the particles is at least 5000 centipoise, and these polymers are either thermoplastics or crosslinking polyurethane polymers.

EP 590 702 describes powder impregnation methods for the production of prepregs in which the powder is composed of a mixture of a thermoplastic and a reactive monomer and, respectively, prepolymers. WO 2005/091715 likewise describes the use of thermoplastics for the production of prepregs.

Prepregs with a matrix based on 2-component polyurethanes (2-C PUR) have been described. The 2-C PUR category comprises the traditional reactive polyurethane resin systems. In principle this is a system made of two separate components. While the critical constituent of one of the components is always a polyisocyanate, e.g. polymeric methylenediphenyl diisocyanates (MDI), the second component is a polyol or polyol mixture or an amino or amine-polyol mixture. The two parts are not mixed with one another until shortly prior to processing. This is then followed by chemical hardening through polyaddition, with formation of a network made of polyurethane and, respectively, polyurea. 2-component systems have a limited processing time (operating time, pot life) after the mixing of the two constituents, since the onset of reaction leads to gradual viscosity increase and finally to gelling of the system. Effective processability time may be determined by numerous variables: reactivity of the reactants, catalysis, concentration, solubility, moisture content, NCO/OH ratio and ambient temperature are the most important [see: Lackharze, [Coating Resins], Stoye/Freitag, Hauser-Verlag 1996, pp. 210/212]. The disadvantage of the prepregs based on 2-C PUR systems of this type is that only a short period of time is available for the processing of the prepreg to give a composite. The storage stability of prepregs of this type is therefore no more than a number of hours, rather than days.

Apart from the different underlying binder, moisture-curing coatings largely correspond to analogous 2C systems both in terms of their composition and in terms of their properties. In principle, the same solvents, pigments, fillers and auxiliaries are used. These systems are unlike 2C coatings in that for reasons of stability they cannot be exposed to any moisture at all before they are applied.

DE 102009001793 and DE 102009001806 describe a method for the production of storage-stable prepregs essentially composed of A) at least one fibrous substrate and B) at least one reactive pulverulent polyurethane composition as matrix material. The systems may also comprise poly(meth)acrylates as co-binder or polyol component. In DE 102010029355 compositions of this type are introduced into the fibre material by a direct melt impregnation process. In DE 102010030234 the method is pretreatment with solvents. These systems have the disadvantage of high melt viscosity and, respectively, the use of solvents which at some stage require removal, and can also have attendant toxicological disadvantages.

In view of the disadvantages and problems associated with the above described conventional systems, it was an object of the present invention to provide novel prepreg technology that can lead to a simpler process for the production of prepreg systems which give no handling problems.

A particular object of the present invention was to provide an accelerated process which can produce prepregs and which, in comparison with known technology, may give a markedly increased storage stability period and/or processing time, for example operating time, and pot life.

SUMMARY OF THE INVENTION

These and other objects are provided by the present invention, the first embodiment of which includes a process for the production of a composite, comprising:
I) preparing a reactive composition comprising:
A) at least one reactive resin component which has at least one acid group, and
B) at least one epoxy-based reactive resin component, wherein one or both of components A) and B) comprises a group capable of free-radical polymerisation;
II) directly impregnating a fibrous substrate with the reactive composition prepared in I);
III) polymerizing the components capable of free-radical polymerisation in the impregnated substrate thermally or with electromagnetic radiation, activatable free-radical initiators, electromagnetic radiation, electron beams, or a plasma, to obtain a prepreg;
IV) shaping at least one prepreg to obtain a moulding; and
V) hardening of the epoxy components in the moulding to obtain the composite.

In a further embodiment, the reactive composition further comprises at least one component selected from the group consisting of:
C) at least one initiator selected from at least one thermal free-radical initiator and/or one photoinitiator,
D) other acids or epoxides without groups reactive in free-radical polymerisation,
E) other components reactive in free-radical polymerisation without acid groups or epoxy groups, and
F) other auxiliaries and additives.

The foregoing paragraphs have been provided by way of general introduction, and are not intended to limit the scope of the following claims. The described embodiments, together with further advantages, will be best understood by reference to the following detailed description taken in conjunction with the appended claims.

DESCRIPTION OF THE PREFERRED EMBODIMENTS

As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. Where a numerical limit or range is stated, the endpoints are included. Also, all values and subranges within a numerical limit or range are specifically included as if explicitly written out.

The objects are achieved by means of a novel process for the production of semifinished composite products and further processing of these to give mouldings.

The invention provides a process for the production of composites, comprising:
I) preparing a reactive composition comprising:
A) at least one reactive resin component which has at least one acid group, and
B) at least one epoxy-based reactive resin component, wherein one or both of components A) and B) comprises a group capable of free-radical polymerisation;
II) directly impregnating a fibrous substrate with the reactive composition prepared in I);
III) polymerizing the components capable of free-radical polymerisation in the impregnated substrate thermally or with electromagnetic radiation, activatable free-radical initiators, electromagnetic radiation, electron beams, or a plasma, to obtain a prepreg;
IV) shaping at least one prepreg to obtain a moulding; and
V) hardening of the epoxy components in the moulding to obtain the composite.

The reactive composition may optionally further comprise at least one of the following components:
C) at least one initiator selected from at least one thermal free-radical initiator and/or one photoinitiator,
D) other acids or epoxides without groups amenable to free-radical polymerisation,
E) other components amenable to free-radical polymerisation without acid groups or epoxy groups, and
F) other auxiliaries and additives.

In one preferred embodiment the quantitative (weight) ratio of acid component A) to epoxy component B) is from 90:10 to 10:90.

It is very particularly preferable that the ratio of acid component to epoxy component is such that for each acid group there are from 0.3 to 3.0, preferably from 0.5 to 2.0, particularly preferably from 0.8 to 1.2, epoxy groups.

The advantage of this system of the invention consists in the production of a thermoplastic semifinished product which may be subjected to a forming process and which for the purposes of the invention is termed prepreg, and which is crosslinked in the manner of a thermoset in a further step during the production of the composite components. The starting formulation is liquid and therefore suitable for impregnation of fibre material without addition of solvents. The semi-finished products are storage-stable at room temperature. They feature greater flexibility than commonly used epoxy systems. Matrices of this type can moreover be designed to be light-resistant, and therefore amenable to use for the production of visible carbon-based components without further coating.

Surprisingly, it has been found possible to produce adequate impregnated, reactive and storage-stable semifinished composite products, by producing these with the abovementioned combination.

Semifinished composite products may thus be obtained which have processing properties at least equal to, or else improved over conventional systems such as described above, and which may be used for the production of composites that perform well in a very wide variety of applications in the construction-industry sector, automobile-industry sector, aerospace-industry sector, energy-technology sector (wind turbines), and in boat building and shipbuilding. The reactive compositions that can be used according to the invention are ecofriendly, inexpensive, have good mechanical properties, are easy to process and feature good weathering resistance after hardening and an appropriate ratio of hardness to flexibility. For the purposes of this invention, the expression semifinished composite products is used synonymously with the expressions prepreg and organopanel. A prepreg is generally a precursor for thermoset composite components. An organopanel is normally a corresponding precursor for thermoplastic composite components.

Substrate

The substrate material preferably used in the semifinished composite product in the process of the invention is characterized in that the fibrous substrates are mostly composed of glass, carbon, plastics such as polyamide (aramid) or polyester, natural fibres, or mineral fibre materials such as basalt fibres or ceramic fibres, individually, or of mixtures, or of a plurality of layers of various fibre types.

The fibrous substrates may be textile sheets made of non-woven, or knitted fabrics, non-knitted structures such as woven fabrics, laid scrims or braided fabrics, or long-fibre or short-fibre materials, individually, or a plurality of layers of various types. Design details are as follows: The fibrous substrate in the present invention may be composed of fibrous material (also often termed reinforcing fibres). A suitable material of which the fibres are composed is generally any material, but preference may be given to using fibrous material made of glass, carbon, plastics such as polyamide (aramid) or polyester, natural fibres, or mineral fibre materials such as basalt fibres or ceramic fibres (oxidic fibres based on aluminium oxides and/or silicon oxides). It may also be possible to use mixtures of fibre types, e.g. woven fabric combinations made of aramid fibres and glass fibres, or carbon and glass fibres. Hybrid composite components using prepregs made of different fibrous substrates are likewise suitable.

The most frequently used fibre types include glass fibres, mainly because they are relatively inexpensive. In principle, any of the types of glass-based reinforcing fibres may be suitable (E glass, S glass, R glass, M glass, C glass, ECR glass, D glass, AR glass, or hollow glass fibres).

Carbon fibres are generally used in high-performance composite materials, and an important factor in such systems is lower density than glass fibre together with high strength. Carbon fibres are fibres produced industrially from carbon-containing starting materials which are pyrolysed to give carbon with graphite-like configuration. A distinction is made between isotropic and anisotropic types: isotropic fibres have only low strength values and are of relatively little industrial significance; anisotropic fibres exhibit high strength values and stiffness values together with low elongation at break. The expression natural fibres is associated with all textile fibres and fibre materials obtained from vegetable and animal material (e.g. wood fibres, cellulose fibres, cotton fibres, hemp fibres, jute fibres, linen fibres, sisal fibres, and bamboo fibres). Aramid fibres, like carbon fibres, have a negative coefficient of thermal expansion, i.e. become shorter when heated. In comparison with carbon fibres, they have markedly lower specific strength and markedly lower modulus of elasticity. In combination with the positive coefficient of expansion of the matrix resin, manufacture of components with high dimensional stability may be achieved. The compressive strength of composite materials made with aramid fibre may be markedly lower than that of carbon-fibre-reinforced plastics. Well-known trade marks for aramid fibres include Nomex® and Kevlar from DuPont, and Teijinconex®, Twaron®) and Technora® from Teijin. Particularly suitable and preferred substrates are those made of glass fibres, carbon fibres, aramid fibres or ceramic fibres. The fibrous material may be a textile sheet. Textile sheets made of nonwoven are suitable, as also are knitted fabrics, and also non-knitted structures such as woven fabrics, laid scrims and braided fabrics. A distinction may be made between long-fibre and short-fibre materials as substrate. Rovings and yarns may likewise be suitable according to the invention. All of the materials mentioned may be suitable as fibrous substrate for the purposes of the invention. "Composites Technologies", Paolo Ermanni (Version 4), script for lecture at ETH Zürich, August 2007, Chapter 7, contains an overview of reinforcing fibres.

According to the invention, the reactive composition comprises a resin component A) having acid groups. Component A) may also comprise functional groups reactive in free-radical polymerisation.

According to the invention, the reactive composition comprises an epoxy component B). This component B) may also comprise functional groups reactive in free-radical polymerisation.

The reactive composition therefore comprises two components, where one or both of components A) and B) has/have a group that can react in free-radical polymerisation.

Resin Component A) Having Functional Groups Reactive in Free-Radical Polymerisation Any of monomeric, oligomeric or polymeric substances that have at least one acid group and that also bear a functional group reactive in free-radical polymerisation may be used as resin component A). Suitable compounds may include acrylate, methacrylate, or vinyl ether groups. Preferred compounds A) include acrylic acid, methacrylic acid, fumaric acid, maleic acid, crotonic acid, itaconic acid, and vinylbenzoic acid. Mixtures including any of these compounds may be employed.

Component A) may also be a compound containing one or more acid groups, but having no functional groups reactive in free-radical polymerisation, as described below.

Epoxy Component B) Having Functional Groups Reactive in Free-Radical Polymerisation Any of monomeric, oligomeric or polymeric substances that have at least one epoxy group and that also bear a functional group reactive in free-radical polymerisation may be used as epoxy component B). Suitable compounds may include acrylate, methacrylate, or vinyl ether groups. Preferred compounds B) include glycidyl acrylate, glycidyl methacrylate (GMA), and also reaction products of polyepoxides, preferably diglycidyl ethers based on bisphenol A and bisphenol F with substoichiometric quantities of acrylic acid or methacrylic acid. Mixtures including any of these compounds may be employed. Epoxides without functional groups reactive in free-radical polymerisation are described below. These epoxides are in principle also suitable as epoxy component B) if they also bear a functional group reactive in free-radical polymerisation.

Initiators C)

Thermal polymerisation initiators suitable for the present invention may be peroxides or azo compounds. It may sometimes be advantageous to use a mixture of various initiators. It is preferable to use, as free-radical initiator, halogen-free peroxides such as permaleate, dilauroyl peroxide, dibenzoyl peroxide, tert-butyl peroctoate, di(tert-butyl) peroxide (DTBP), di(tert-amyl)peroxide (DTAP), tert-butyl peroxy(2-ethylhexyl) carbonate (TBPEHC) and other peroxides that decompose at high temperature. Particularly preferred initiators include dilauroyl peroxide and dibenzoyl peroxide. One particular embodiment of a redox initiator system may be the combination of peroxides and accelerators, in particular amines. It is also possible to use mixtures.

Amines that may be suitable according to the present invention include tertiary aromatically substituted amines, such as in particular N,N-dimethyl-p-toluidine, N,N-bis(2-hydroxyethyl)-p-toluidine or N,N bis(2-hydroxypropyl)-p-toluidine.

Photoinitiators and production thereof are described in "Radiation Curing in Polymer Science & Technology, Vol II: Photoinitiating Systems" by J. P. Fouassier and J. F. Rabek, Elsevier Applied Science, London and New York, 1993. These are often α-hydroxyketones, derivatives thereof or phosphines. If the photoinitiators are present, quantities present of these can be from 0.2 to 10% by weight. Photoinitiators that may be used include the following commercially available products: BASF-CGI-725 (BASF), CHIVACURE 300 (Chitec), IRGACURE PAG 121 (BASF), IRGACURE PAG 103 (BASF), CHIVACURE 534 (Chitec), H-NU 470 (Spectra Group Limited), TPO (BASF), 25 IRGACURE 651 (BASF), IRGACURE 819 (BASF), IRGACURE 500 (BASF), IRGACURE 127 (BASF), IRGACURE 184 (BASF), DURACURE 1173 (BASF).

If the initiators are added, the concentration present may be from 0.2 to 10% by weight, preferably from 0.5 to 3% by weight and particularly preferably from 3 to 6% by weight in the composition. Mixtures including any of these materials may be employed.

Other Resin Components A) and D) Without Groups Reactive in Free-Radical Polymerisation Examples of components A) and D) containing acid groups according to the present invention include monomeric, oligomeric or polymeric carboxylic acids, preferably di- and polycarboxylic acids. The preferred carboxylic acids may be aliphatic, cycloaliphatic, aromatic and/or heterocyclic. The carboxylic acids may optionally have halogen atoms as substituents. Examples of suitable carboxylic acids include succinic acid, adipic acid, suberic acid, azelaic acid, sebacic acid, phthalic acid, terephthalic acid, isophthalic acid, trimellitic acid, pyromellitic acid, tetrahydrophthalic acid, hexahydrophthalic acid, hexahydroterephthalic acid, di- and tetrachlorophthalic acid, endomethylenetetrahydrophthalic acid, glutaric acid, 1,4-cyclohexanedicarboxylic acid and, in so far as they are accessible, anhydrides thereof. Mixtures including any of these compounds may be employed.

It may also be possible to use carboxy-functionalised polyesters. The polyesters used according to the invention may be obtained through polycondensation of one or more dicarboxylic acids and one or more diols and/or polyols. The condensation takes place in a manner known per se in an inert gas atmosphere at temperatures of from 100 to 260° C., preferably from 130 to 220° C., in the melt or in an azeotropic procedure as described for example, in Methoden der Organischen Chemie [Methods for Organic Chemistry] (Houben-Weyl); Volume 14/2, pp. 1 to 5, 21 to 23, 40 to 44, Georg Thieme Verlag, Stuttgart, 1963, or in C. R. Martens, Alkyd Resins, pp. 51 to 59, Reinhold Plastics Appl. Series, Reinhold Publishing Comp., New York, 1961. The acid number of preferred polyesters may be from 20 to 500 mg KOH/g. Mixtures including any of these materials may be employed.

Epoxy Compounds B) and D) Without Groups Reactive in Free-Radical Polymerisation Suitable epoxy compounds B) and D) without groups reactive in free-radical polymerisation are described in EP675 185. It may be possible to use a wide variety of the relevant known compounds which comprise more than one epoxy group, preferably two epoxy groups, in each molecule. These epoxy compounds (epoxy resins) may optionally be saturated, unsaturated, aliphatic, cycloaliphatic, aromatic or heterocyclic, and may also comprise hydroxy groups. They may moreover comprise substituents of a type that does not cause any disruptive side reactions under the mixing conditions or reaction conditions, for example alkyl substituents or aryl substituents, ether groups and the like. It may be preferable that these are glycidyl ethers which derive from polyhydric phenols, in particular bisphenols, or else from novolacs, where the molar masses of these divided by the number of epoxy groups ME ("epoxy equivalent weights", "EV value") are from 100 to 500 g/mol, preferably from 150 to 250 g/mol.

Examples of polyhydric phenols suitable for the present invention include: resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, bis(4-hydroxyphenyl)-1,1-ethane, bis(4-hydroxyphenyl)-1,1-isobutane, 2,2-bis(4-hydroxy-tert-butylphenyl)propane, bis(2-hydroxynaphthyl)methane, 1,5-dihydroxynaphthalene, tris-(hydroxyphenyl)methane, bis(4-hydroxyphenyl) ether, bis(4-hydroxyphenyl) sulphone, inter alia, and also the chlorination and bromination products of the abovementioned compounds, for example tetrabromobisphenol A. Preference may be given to liquid diglycidyl ethers based on bisphenol A and bisphenol F with epoxy equivalent weight of from 180 to 190 g/mol.

Suitable materials may also include polyglycidyl ethers of polyalcohols, for example 1,2-ethanediol diglycidyl ether, 1,2-propanediol diglycidyl ether, 1,3-propanediol diglycidyl ether, butanediol diglycidyl ether, pentanediol diglycidyl ether (also neopentyl glycol diglycidyl ether), hexanediol diglycidyl ether, diethylene glycol diglycidyl ether, dipropylene glycol diglycidyl ether, higher polyoxyalkylene glycol diglycidyl ethers, e.g. higher polyoxyethylene glycol diglycidyl ethers and polyoxypropylene glycol diglycidyl ethers, mixed polyoxyethylene-propylene glycol diglycidyl ethers, polyoxytetramethylene glycol diglycidyl ethers, polyglycidyl ethers of glycerol, of 1,2,6-hexanetriol, of trimethylolpropane, of trimethylolethane, of pentaerythritol, of sorbitol, polyglycidyl ethers of alkoxylated polyols (e.g. of glycerol, of trimethylolpropane, of pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil, triglycidyl tris(2-hydroxyethyl) isocyanurate.

Other compounds that can be used as component B) or D) are: poly(N-glycidyl) compounds obtainable by dehydrohalogenation of the reaction products of epichlorohydrin with amines such as aniline, n-butylamine, bis(4-aminophenyl) methane, m-xylylenediamine or bis(4-methylaminophenyl) methane. Among the poly(N-glycidyl) compounds are also, however, triglycidyl isocyanurate, triglycidylurazole, and also oligomers of these, N,N'-diglycidyl derivatives of cycloalkyleneureas and diglycidyl derivatives of hydantoins, inter alia.

It is moreover also possible to use polyglycidyl esters of polycarboxylic acids which are obtained by reaction of epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, tetrahydrophthalic acid, hexahydrophthalic acid, 2,6-naphthalindicarboxylic acid, and higher diglycidyl dicarboxylates, an example being dimerised or trimerised linolenic acid. Examples are diglycidyl adipate, diglycidyl phthalate and diglycidyl hexahydrophalate.

Mention may moreover be made of glycidyl esters of unsaturated carboxylic acids, and epoxidised esters of unsaturated alcohols or of unsaturated carboxylic acids. Small quantities of monoepoxides according to (A2) and (B2) (reactive diluents) can be used concomitantly in addition to the polyglycidyl ethers, examples of said monoepoxides being methylglycidyl ether, butylglycidyl ether, allylglycidyl ether, ethylhexyl glycidyl ether, long-chain aliphatic glycidyl ether, for example cetyl glycidyl ether and stearyl glycidyl ether, monoglycidyl ethers of a higher isomeric alcohol mixture, glycidyl ethers of a mixture of C12 to C13 alcohols, phenyl glycidyl ether, cresyl glycidyl ether, p-tert-butylphenyl glycidyl ether, p-octylphenyl glycidyl ether, p-phenylphenyl glycidyl ether, glycidyl ether of an alkoxylated lauryl alcohol, and also monoepoxides such as epoxidised monounsaturated hydrocarbons (butylene oxide, cyclohexene oxide, styrene oxide), halogenated epoxides, e.g. epichlorohydrin, in proportions by mass of up to 30%, preferably from 10 to 20%, based on the mass of the polyglycidyl ethers.

A detailed list of the suitable epoxy compounds is found in "Epoxidverbindungen and Epoxidharze" [Epoxy compounds and epoxy resins] by A. M. Paquin, Springer Verlag, Berlin 1958, Chapter IV, and in Lee Neville "Handbook of Epoxy Resins", 1967, Chapter 2.

It is always also possible to use mixtures of a plurality of epoxy resins. Examples that can be used here of components B) or D) containing epoxy groups are glycidyl ethers and glycidyl esters, aliphatic epoxides, diglycidyl ethers based on bisphenol A and glycidyl methacrylates. Other examples of epoxides of this type are triglycidyl isocyanurate (TGIC, trade name ARALDIT 810, Huntsman), mixtures of diglycidyl terephthalate and triglycidyl trimellitate (trade name ARALDIT PT 910 and 912, Huntsman), glycidyl esters of versatic acid (trade name KARDURA E10, Shell), 3,4-epoxycyclohexylmethyl 3',4'-epoxycyclohexanecarboxylate (ECC), ethylhexyl glycidyl ether, butyl glycidyl ether, pentaerythritol glycidyl ether, (trade name POLYPDX R 16, UPPC AG), and also other types of polyepoxy compound having free epoxy groups.

It is also possible to use mixtures of the epoxy compounds mentioned.

Other Resin Components E)

The term (meth)acrylates here is descriptive of methacrylates and acrylates, and also mixtures of methacrylates with acrylates.

The compounds E) present in the reactive resin may be compounds selected from the group of the (meth)acrylates, for example alkyl (meth)acrylates of straight-chain, branched or cycloaliphatic alcohols having from 1 to 40 C atoms, e.g. methyl (meth)acrylate, ethyl (meth)acrylate, n-butyl (meth)acrylate, 2-ethylhexyl (meth)acrylate or isobornyl (meth)acrylate.

Other suitable constituents of monomer mixtures include additional monomers having another functional group, for example, α,β-unsaturated mono- or dicarboxylic acids, e.g. esters of acrylic acid or methacrylic acid with dihydric alcohols, an example being hydroxyethyl (meth)acrylate or hydroxypropyl (meth)acrylate; acrylamide or methacrylamide; or dimethylaminoethyl (meth)acrylate. Other suitable constituents of monomer mixtures may include silyl-functional (meth)acrylates. The monomer mixtures may comprise not only the (meth)acrylates described above but also other unsaturated monomers which may be copolymerised with the abovementioned (meth)acrylates by free-radical polymerisation. Among these are inter alia 1-alkenes and styrenes, including mixtures of all these.

Crosslinkers are an optional constituent of the reactive resin of the invention, as component E). In particular, these may be polyfunctional methacrylates such as allyl (meth) acrylate. Particular preference may be given to di- or tri (meth)acrylates, for example 1,4-butanediol di(meth)acrylate, tetraethylene glycol di(meth)acrylate, triethylene glycol di(meth)acrylate, hexanediol diacrylate or trimethylolpropane tri(meth)acrylate. Mixtures including any of these compounds may be employed.

The detail of the proportion and composition of the monomers may advantageously be selected with a view to the desired technical function and to the substrate material to be wetted.

The resin component may comprise not only the monomers listed as component E) but also polymers termed prepolymer for the purposes of this application in order to provide better differentiation, preferably polyester (meth) acrylates, polyurethane (meth)acrylates or poly(meth)acrylates. These are used in order to improve polymerisation properties, mechanical properties, adhesion to the substrate material, viscosity adjustment during the processing or wetting of the substrate material with the resin, and also the optical properties of the resins. If prepolymer is present, the proportion thereof here is from 1% by weight to 50% by weight, preferably from 15% by weight to 40% by weight. The prepolymers may optionally have additional functional groups intended to promote adhesion or intended for copolymerisation in the crosslinking reaction, for example, double bonds. It is preferable that the prepolymers have hydroxy, amine or thiol groups.

The monomers involved in the composition of the poly (meth)acrylates may generally be the same as those listed in relation to the monomers in the resin system. They may be obtained by solution, emulsion, suspension, bulk or precipitation polymerisation, and are added as pure substance to the system.

The polyesters may be obtained in bulk via polycondensation or ring-opening polymerisation, are composed of the units known for these applications, and may subsequently be subjected to reaction with (meth)acrylic acid.

Mixtures including any of these units may be employed.
Component F)

Any of the compounds conventionally employed for free-radical polymerisation may be used as chain-transfer agent component F). It may be preferable to use mercaptans such as n-dodecyl mercaptan.

UV stabilisers may likewise be used as component F). The UV stabilizers may preferably be selected from the group consisting of benzophenone derivatives, benzotriazole derivatives, thioxanthonate derivatives, piperidinolcarboxylic ester derivatives and cinnamic ester derivatives.

Compounds preferably used as stabilisers and inhibitors of component F) include substituted phenols, hydroquinone derivatives, phosphines and phosphites. Compounds preferably used as rheology additives include polyhydroxycarboxamides, urea derivatives, salts of unsaturated carboxylic esters, alkylammonium salts of acidic phosphoric acid derivatives, ketoximes, amine salts of p-toluenesulphonic acid, amine salts of sulphonic acid derivatives, and also aqueous or organic solutions or mixtures of the compounds. Particularly suitable rheology additives include materials based on fumed or precipitated, optionally also silanised, silicas with BET surface area of from 10 to 700 $nm^2/g$. Antifoams are preferably selected from the group of the alcohols, hydrocarbons, paraffin-based mineral oils, glycol derivatives, derivatives of glycolic esters, acetic esters and polysiloxanes. Mixtures including any of these compounds may be employed.

Step I may be conducted by stirring components A) and B) together, optionally with other components C)-E).

Step II, the impregnation, may be achieved by saturation of the fibres, woven fabrics or laid scrims with the formulation produced in step I. It is preferable that the impregnation is conducted at room temperature.

Step III, the polymerisation of the resin component, directly follows step II. The polymerisation in step III is initiated by heating, irradiation with electromagnetic radiation, preferably UV radiation, or with electron beams, or by applying a plasma field. During the polymerization the temperature is maintained below the hardening temperature required for step V.

UV lamps are described in "Radiation Curing in Polymer Science & Technology, Vol I: Fundamentals and Methods" by J. P. Fouassier, J. F. Rabek, Elsevier Applied Science, London and New York, 1993, Chapter 8, pp. 453 to 503. Preference is given to UV lamps which emit little radiated heat or none at all, e.g. UV LED lamps.

Electron beam curing and electron beam curing systems are described in "Radiation Curing in Polymer Science & Technology, Vol I: Fundamentals and Methods" by J. P. Fouassier, J. F. Rabek, Elsevier Applied Science, London and New York, 1993, Chapter 4, pp. 193 to 225 and Chapter 9, pp. 503 to 555. If electron beams are used to initiate the polymerisation reaction, it is then not necessary to use photoinitiators.

The same applies to plasma methods. Plasmas are often used in vacuo. Plasma polymerisation of MMA is described by C. W. Paul, A. T. Bell and D. S. Soong "Initiation of Methyl Methacrylate Polymerization by the Nonvolatile Products of a Methyl Methacrylate Plasma. 1. Polymerization Kinetics" (Macromolecules 1985, Vol. 18, 11, 2312-2321). A vacuum plasma of the type described may be used in the present invention. According to the invention, the present process uses an atmospheric-pressure plasma as free-radical source. For this commercially available plasma jets/plasma beams of the type supplied by Plasmatreat GmbH or from Diener GmbH may be used. The plasma operates under atmospheric pressure, and is inter alia used in the automobile industry for the removal of greases or other contaminants on surfaces. In contrast to the plasma process described in the literature, the plasma according to the present invention may be produced outside of the actual reaction zone (polymerisation), and is propelled at high flow velocity onto the surface of the reactive resin coating that has been applied and that requires treatment. A "plasma flare" is thus produced. The process has the advantage that the actual formation of the plasma is not influenced by the substrate, and this leads to low levels of process risk. The plasma jets may normally be operated with air, producing an oxygen/nitrogen plasma. The plasma in the plasma jets is generated by electrical discharge in the interior of the nozzle. The electrodes are electrically isolated. A high voltage is thus applied until sparking occurs between the electrodes. Discharge is achieved. It is possible here to vary the number of discharges per unit of time. The discharges can result from pulses of direct voltage. Another possibility is to achieve the discharge by using an alternating voltage.

Steps I-III produce a prepreg. After production of the prepreg on the fibre with the aid of heating, radiation or plasmas in step III, the same product can be stacked and converted to a required shape. The prepregs are then storage-stable, i.e. can be stored over period of up to several months, without any occurrence of crosslinking.

In step IV, the resultant prepregs may, as required, be combined to give various shapes and cut to size. In particular, a cutting-to-size process, and optionally a sewing process or other type of fixing process is/are carried out in order to consolidate a plurality of semifinished composite products to give a single composite, and prior to final crosslinking of the matrix material to give the matrix.

After step III or IV, the prepregs produced according to the invention have high storage stability at room temperature. This depends on the reactive composition present and is at least a few days at room temperature. The prepregs may generally be storage-stable for several weeks at room temperature. The resultant prepregs are generally not sticky, and they therefore have very good properties in relation to handling and to further processing. The (highly) reactive compositions used according to the invention accordingly exhibit very good adhesion and distribution on the fibrous substrate.

Step V achieves the final hardening of the prepregs to give mouldings which have been crosslinked in the manner of a thermoset. This is achieved by thermal hardening of the acid groups of resin component A) with the epoxy groups of the component B).

Step V uses heat to achieve the final hardening. This hardening is achieved at temperatures of from 80 to 220° C. and with hardening times of from 5 sec to 72 h, depending on usage and quantity of catalysts, preferably at temperatures of from 140 to 200° C. and with hardening times of from 3 min to 30 min. It is preferable that an external pressure is applied during the crosslinking reaction. The polymer compositions used according to the invention provide very good flow with low viscosity, and therefore good impregnation capability and, after hardening, excellent chemical resistance. When aliphatic crosslinking agents are used, use according to the invention of the functionalised poly(meth)acrylates also achieves good weathering resistance.

However, it is also possible to use specific catalysts as component F) to accelerate the hardening reaction in step V, e.g. quaternary ammonium salts, preferably carboxylates, halides or hydroxides, or basic amine derivatives, e.g. amidines, guanidines or imidazole compounds. These catalyst systems can provide a reduction of the curing temperature for the hardening reaction as far as 100° C., or else reduce curing times at higher temperatures.

Other Constituents of the Composites

The composites may also comprise other additives, in addition to the resin component and the substrate material. Additives may include light stabilisers, e.g. sterically hindered amines, or other auxiliaries as described in EP 669 353, the total quantity of such additives being from 0.05 to 5% by weight. A quantity of up to 30% by weight, based on the entire composition, of fillers and pigments such as titanium dioxide may be added. It is moreover possible to add additional substances such as levelling agents, e.g. polysilicones, or adhesion promoters, e.g. those based on acrylate, for the production of the reactive compositions of the invention. Other conventionally known components may optionally be present. It is also possible to include the following auxiliaries and additional substances: chain-transfer agents, plasticisers, stabilisers and/or inhibitors. It may also be possible to use dyes, fillers, wetting agents, dispersing agents and levelling agents, adhesion promoters, UV stabilisers, antifoams and rheology additives.

The invention also provides the use of the composites, in particular with fibrous substrates made of glass fibres, of carbon fibres or of aramid fibres.

The invention in particular also provides the use of the prepregs produced according to the invention for the production of composites in boat building and shipbuilding, in aerospace technology, in automobile construction, for two-wheeled vehicles, preferably motorcycles and pedal cycles, in the automotive, construction, medical-technology, and sports sectors, the electrical and electronics industry, and in energy-generation installations, e.g. for rotor blades in wind turbines.

The invention also provides, produced from the semifinished composite products and, respectively, prepregs produced according to the invention, the mouldings and, respectively, composite components composed of at least one fibrous substrate and of at least one crosslinked reactive composition.

The invention also provides composites obtained by the following operations:
I) production of a reactive composition, comprising:
 A) at least one reactive resin component which has at least one acid group, and
 B) at least one epoxy-based reactive resin component, wherein one or both of components A) and B) has/have a group that can react in free-radical polymerisation;
II) direct impregnation of a fibrous substrate with the composition produced in I;
III) polymerization of the resin components reactive to free radical polymerization thermally or with electromagnetic radiation activatable free-radical initiators, electromagnetic radiation, electron beams, or a plasma to obtain a prepreg;
IV) shaping the prepeg to give the moulding; and
V) hardening of the epoxy component in the moulding.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. In this regard, the description herein is to be understood as illustrative in nature, and not as restrictive.

The following Example provides further explanation of the invention.

Example 14.2 g of glycidyl methacrylate (Aldrich) were mixed with 7.2 g of acrylic acid (Aldrich) and 21.4 g of isobornyl acrylate (Aldrich). 3.4 g of Irgacure 184 (photoinitiator from BASF) were also added to the mixture. This mixture was used to saturate a woven glass fibre fabric (KVG, style 7628, 200 g/m$^2$) and irradiated from both sides with UV (Mini-cure, 80 W/cm) in each case at 2×3 m/min. The prepreg was then non-sticky. Four prepreg layers of this type were mutually superposed, loaded with a weight of one kg, and fully hardened at 160° C. over a period of 60 min. T-shaped test bars (length 7.5 cm, width 4 mm, thickness 0.5 mm, cross-sectional area 2 mm$^2$) were punched out from the finished composite and subjected to a tensile test. The average value from three tests using an average maximal force of 796 N was tensile strength of 400 MPa and elongation at break of 9.5%.

The invention claimed is:

1. A process for the production of a composite, comprising:
   I) preparing a reactive composition comprising:
     A) at least one reactive resin component which has at least one acid group, and
     B) at least one epoxy-based reactive resin component, wherein
     one or both of components A) and B) comprises a group capable of free-radical polymerisation, and
     for each acid group of component A) there are from 03 to 3.0 epoxy groups of component B);
   II) directly impregnating a fibrous substrate with the reactive composition prepared in I);
   III) polymerizing the components capable of free-radical polymerisation in the impregnated substrate thermally or with electromagnetic radiation, activatable free-radical initiators, electromagnetic radiation, electron beams, or a plasma, to obtain a prepreg;
   IV) shaping the prepreg to obtain a moulding; and
   V) hardening of the epoxy components in the moulding to obtain the composite.

2. The process for the production of a composite according to claim 1, wherein the reactive composition further comprises at least one component selected from the group consisting of:
   C) at least one initiator selected from at least one thermal free-radical initiator and/or one photoinitiator,
   D) other acids or epoxides without groups reactive in free-radical polymerisation,
   E) other components reactive in free-radical polymerisation without acid groups or epoxy groups, and
   F) other auxiliaries and additives.

3. The process for the production of a composite according to claim 2, wherein the reactive composition further comprises component D), and at least one of B) and D) comprise an epoxy compound not having a group reactive to free-radical polymerisation selected from a diglycidyl ether based on bisphenol A and/or bisphenol F with epoxy equivalent weight of from 180 to 190 g/mol.

4. The process for the production of a composite according to claim 2, wherein the reactive composition further comprises component D), and resin components A) and/or D) comprise a compound not having a group capable of free-radical polymerisation selected from the group consisting of a monomeric carboxylic acid, an oligomeric carboxylic acid and a polymeric carboxylic acid.

5. The process for the production of a composite according to claim 4, wherein resin components A) and/or D) comprise at least one acid selected from the group consisting of succinic acid, adipic acid, suberic acid, azelaic acid, sebacic acid, phthalic acid, terephthalic acid, isophthalic acid, trimellitic acid, pyromellitic acid, tetrahydrophthalic acid, hexahydrophthalic acid, hexahydroterephthalic acid, di- and tetrachlorophthalic acid, endomethylenetetrahydrophthalic acid, glutaric acid, 1,4-cyclohexanedicarboxylic acid and an anhydride thereof.

6. The process for the production of a composite according to claim 4, wherein resin components A) and/or D) comprise a carboxy-functionalised polyester.

7. The process for the production of a composite according to claim 2, wherein the composition comprises a reactive resin as component E) which is selected from a resin obtained by polymerization of at least one selected from the group consisting of methyl (meth)acrylate, ethyl (meth) acrylate, n-butyl (meth)acrylate, 2-ethylhexyl (meth)acrylate, isobornyl (meth)acrylate, hydroxyethyl (meth)acrylate, hydroxypropyl (meth)acrylate; acrylamide, methacrylamide, dimethylaminoethyl (meth)acrylate and a poly(meth) acrylate.

8. The process for the production of a composite according to claim 2, wherein the composition comprises a crosslinking agent as component E) and the crosslinking agent is at least one selected from the group consisting of allyl (meth)acrylate, 1,4-butanediol di(meth)acrylate, tetraethylene glycol di(meth)acrylate, triethylene glycol di(meth) acrylate, hexanediol diacrylate and trimethylolpropane tri (meth)acrylate, a polyester (meth)acrylate, a polyurethane (meth)acrylate and a poly(meth)acrylate.

9. The process for the production of a composite according to claim 1, wherein a weight ratio of acid component A) to epoxy component B) is from 90:10 to 10:90.

10. The process for the production of a composite according to claim 1, wherein the fibrous substrate comprises at least one layer comprising at least one material selected from the group consisting of a glass, a carbon, a plastic, a natural fibre and a mineral fibre.

11. The process for the production of a composite according to claim 1, wherein the fibrous substrate is of a form selected from the group consisting of a non-woven textile sheet, a knitted fabric, a non-knitted fabric, a laid scrim, a braided fabric, a long-fibre material and a short-fibre material.

12. The process for the production of a composite according to claim 1, wherein the fibrous substrate comprises at least one layer comprising at least one fibre selected from the group consisting of a glass fibre, a carbon fibre, an aramid fibre and a ceramic fibre.

13. The process for the production of a composite according to claim 1, wherein component A) comprises at least one group selected from the group consisting of an acrylate group, a methacrylate group, and a vinyl ether group.

14. The process for the production of a composite according to claim 1, wherein component A) comprises an acid selected from the group consisting of acrylic acid, methacrylic acid, fumaric acid, maleic acid, crotonic acid, itaconic acid, and vinylbenzoic acid.

15. The process for the production of a composite according to claim 1, wherein component B) comprises at least one group selected from the group consisting of an acrylate group, a methacrylate group, and a vinyl ether group.

16. The process for the production of a composite according to claim 1, wherein component B) comprises at least one selected from the group consisting of glycidyl acrylate, glycidyl methacrylate, a reaction product of a polyepoxide with a substoichiometric quantity of acrylic acid and a reaction product of a polyepoxide with a substoichiometric quantity of methacrylic acid.

17. The process for the production of a composite according to claim 1, wherein component B) comprises one selected from the group consisting of a reaction product of bisphenol A with a substoichiometric quantity of acrylic acid, a reaction product of bisphenol F with a substoichiometric quantity of acrylic acid, a reaction product of bisphenol A with a substoichiometric quantity of methacrylic acid, and a reaction product of bisphenol F with a substoichiometric quantity of methacrylic acid.

18. The process for the production of a composite according to claim 1, wherein component C) is selected from the group consisting of permaleate, dilauroyl peroxide, dibenzoyl peroxide, tert-butyl peroctoate, di(tert-butyl)peroxide, di(tert-amyl)peroxide, tert-butyl peroxy(2-ethylhexyl) carbonate, N,N-dimethyl-p-toluidine, N,N-bis(2-hydroxyethyl)-p-toluidine and N,N-bis(2-hydroxypropyl)-p-toluidine.

19. A composite comprising at least one fibrous substrate and of at least one crosslinked reactive composition obtained according to the process of claim 1.

* * * * *